United States Patent
Davis et al.

(10) Patent No.: US 8,959,189 B2
(45) Date of Patent: Feb. 17, 2015

(54) METHOD AND SYSTEM FOR MODELING A NETWORK USING HISTORICAL WEATHER INFORMATION AND OPERATION WITH ADAPTIVE CODING AND MODULATION (ACM)

(75) Inventors: Wallace Davis, Scottsdale, AZ (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 155 days.

(21) Appl. No.: 13/436,302

(22) Filed: Mar. 30, 2012

(65) Prior Publication Data

US 2012/0191824 A1 Jul. 26, 2012

Related U.S. Application Data

(60) Provisional application No. 61/596,124, filed on Feb. 7, 2012.

(51) Int. Cl.
*G06F 15/177* (2006.01)
*H04L 12/24* (2006.01)
*H04L 12/26* (2006.01)
*H04B 7/185* (2006.01)

(52) U.S. Cl.
CPC ............ *H04L 41/145* (2013.01); *H04L 41/083* (2013.01); *H04L 43/0876* (2013.01); *H04B 7/18513* (2013.01)
USPC ........................................................ 709/220

(58) Field of Classification Search
USPC ............................... 455/73; 370/252; 709/220
See application file for complete search history.

(56) References Cited

U.S. PATENT DOCUMENTS

| | | | | |
|---|---|---|---|---|
| 5,231,646 A | * | 7/1993 | Heath et al. | 375/130 |
| 5,771,261 A | * | 6/1998 | Anbar | 374/45 |
| 6,108,317 A | * | 8/2000 | Jones et al. | 370/320 |
| 6,463,279 B1 | * | 10/2002 | Sherman et al. | 455/427 |
| 6,771,966 B1 | | 8/2004 | Chow | |
| 6,985,735 B2 | * | 1/2006 | Gustafsson | 455/446 |
| 7,751,337 B2 | * | 7/2010 | McLain | 370/252 |
| 7,990,874 B2 | * | 8/2011 | del Rio Herrero et al. | 370/236 |
| 7,991,353 B2 | * | 8/2011 | Moore, III | 455/13.2 |
| 8,332,449 B2 | * | 12/2012 | Chen et al. | 708/250 |

(Continued)

FOREIGN PATENT DOCUMENTS

| | | |
|---|---|---|
| CN | 102136946 A | 7/2011 |
| JP | 2001313598 A | 11/2001 |
| KR | 100685740 B1 | 2/2007 |

*Primary Examiner* — Kevin Bates
*Assistant Examiner* — Clarence D McCray
(74) *Attorney, Agent, or Firm* — Booth Udall Fuller, PLC

(57) ABSTRACT

A method of dynamically modeling performance of a communications network that may involve modeling a communications network using a processor by performing a link budget analysis (LBA) for a proposed configuration of the communications network with at least one transmitter, at least one satellite repeating relay, and at least one remote receiver, determining link performance of the communications network by applying historical environmental data to the model, adjusting one or more network configuration parameters based on the determined link performance to improve performance of the modeled communications network, and determining one or more final network configuration parameters by iteratively performing the LBA and adjusting the one or more network configuration parameters based on the determined link performance and historical environmental data.

52 Claims, 14 Drawing Sheets

(56) References Cited

U.S. PATENT DOCUMENTS

| | | |
|---|---|---|
| 8,346,161 B2 * | 1/2013 | Sogabe et al. ............... 455/12.1 |
| 8,483,940 B2 * | 7/2013 | Chapman et al. ............. 701/117 |
| 8,514,098 B2 * | 8/2013 | Montgomery et al. .... 340/855.4 |
| 2003/0004780 A1 * | 1/2003 | Smith et al. .................... 705/10 |
| 2003/0095263 A1 * | 5/2003 | Varshneya et al. ............ 356/477 |
| 2003/0191568 A1 * | 10/2003 | Breed ............................. 701/36 |
| 2004/0158863 A1 * | 8/2004 | McLain ........................ 725/73 |
| 2007/0005334 A1 * | 1/2007 | Salmonsen .................... 703/26 |
| 2009/0082642 A1 * | 3/2009 | Fine .............................. 600/300 |
| 2009/0182796 A1 * | 7/2009 | Chen et al. ................... 708/250 |
| 2009/0276250 A1 * | 11/2009 | King et al. ....................... 705/5 |
| 2009/0319236 A1 * | 12/2009 | Blaunshtein et al. ............. 703/1 |
| 2010/0054131 A1 * | 3/2010 | del Rio Herrero et al. ... 370/236 |
| 2011/0043759 A1 * | 2/2011 | Bushinsky .................... 351/210 |
| 2011/0170574 A1 * | 7/2011 | Ripple et al. .................. 375/132 |
| 2011/0176603 A1 * | 7/2011 | Beeler et al. ............. 375/240.02 |
| 2011/0287779 A1 * | 11/2011 | Harper ....................... 455/456.1 |
| 2011/0300875 A1 * | 12/2011 | Kim et al. .................. 455/456.1 |
| 2011/0312290 A1 * | 12/2011 | Beeler et al. ............... 455/114.3 |
| 2012/0002701 A1 * | 1/2012 | Morris et al. ................. 375/130 |
| 2012/0191824 A1 * | 7/2012 | Davis et al. .................... 709/220 |
| 2013/0045698 A1 * | 2/2013 | Dale ............................... 455/98 |
| 2013/0063300 A1 * | 3/2013 | O'Regan et al. ......... 342/357.25 |

\* cited by examiner

| CALCULATIONS AT SATURATION | VALUE | | | UNITS |
|---|---|---|---|---|
| Gain 1m^2 | 44.53 | | | dB/m2 |
| Uplink C/No | 108.07 | | | dB.Hz |
| Downlink C/No | 112.97 | | | dB.Hz |
| Total C/No | 106.85 | | | dB.Hz |
| Uplink EIRP for saturation | 73.08 | | | dBW |
| Effective SFD | -90 | | | dBW/m2 |

FIG. 5A

| GENERAL CALCULATIONS | UP | DOWN | | UNITS |
|---|---|---|---|---|
| Elevation | 34 | 34 | | degrees |
| True azimuth | 237.17 | 237.17 | | degrees |
| Compass bearing | 232.99 | 232.99 | | degrees |
| Path distance to satellite | 38263.88 | 38263.88 | | km |
| Propagation time delay | 0.127634 | 0.127634 | | seconds |
| Antenna efficiency | 0.12 | 31.34 | | % |
| Antenna gain | 26 | 56 | | dBi |
| Availability (average year) | 99.95 | 99.95 | | % |
| Link downtime (average year) | 4.383 | 4.383 | | hours |
| Availability (worst month) | 99.79 | 99.79 | | % |
| Link downtime (worst month) | 1.537 | 1.537 | | hours |

FIG. 5B

| UPLINK CALCULATION | CLEAR | RAIN UP | RAIN DOWN | UNITS |
|---|---|---|---|---|
| Uplink transmit EIRP | 43.94 | 43.94 | 43.94 | dBW |
| Transponder input back-off (total) | 6.5 | 6.5 | 6.5 | dB |
| Input back-off per carrier | 13.9 | 16.98 | 13.9 | dB |
| Antenna mispoint | 0.3 | 0.3 | 0.3 | dB |
| Free space loss | 207.18 | 207.18 | 207.18 | dB |
| Atmospheric absorption | 0.14 | 0.22 | 0.14 | dB |
| Tropospheric scintillation fading | 0 | 0.47 | 0 | dB |
| Cloud attenuation | 0 | 0.12 | 0 | dB |
| Rain attenuation | 0 | 2.85 | 0 | dB |
| Total attenuation (gas-rain-cloud-scintillation) | 0.14 | 3.22 | 0.14 | dB |
| Other path losses | 0 | 0 | 0 | dB |
| Uplink power control | 0 | 0 | 0 | dB |
| Uncompensated fade | 0 | 3.08 | 0 | dB |
| C/No (thermal) | 78.92 | 75.84 | 78.92 | dB.Hz |
| C/N (thermal) | 9.05 | 5.97 | 9.05 | dB |
| C/ACI | 25.03 | 21.95 | 25.03 | dB |
| C/ASI | 6.53 | 3.45 | 6.53 | dB |
| C/XPI | 25.03 | 21.92 | 25.03 | dB |
| C/IM | 30.03 | 30.03 | 30.03 | dB |
| C/(N+I) [ = Es/(No+Io) ] | 4.51 | 1.44 | 4.51 | dB |
| Eb/(No+Io) | 3.24 | 0.16 | 3.24 | dB |

FIG. 5C

| DOWNLINK CALCULATION | CLEAR | RAIN UP | RAIN DOWN | UNITS |
|---|---|---|---|---|
| Satellite EIRP total | 56 | 56 | 56 | dBW |
| Transponder output back-off (total) | 4.1 | 4.1 | 4.1 | dB |
| Output back-off per carrier | 11.5 | 14.58 | 11.5 | dB |
| Satellite EIRP per carrier | 44.5 | 41.42 | 44.5 | dBW |
| Antenna mispoint | 0.3 | 0.3 | 0.3 | dB |
| Free space loss | 205.65 | 205.65 | 205.65 | dB |
| Atmospheric absorption | 0.11 | 0.11 | 0.16 | dB |
| Tropospheric scintillation fading | 0 | 0 | 0.3 | dB |
| Cloud attenuation | 0 | 0 | 0.08 | dB |
| Rain attenuation | 0 | 0 | 1.89 | dB |
| Total attenuation (gas-rain-cloud-scintillation) | 0.11 | 0.11 | 2.15 | dB |
| Other path losses | 0 | 0 | 0 | dB |
| Noise increase due to precipitation | 0 | 0 | 2.25 | dB |
| Downlink degradation (DND) | 0 | 0 | 4.3 | dB |
| Total system noise | 134.01 | 134.01 | 225.12 | K |
| Figure of merit (G/T) | 34.43 | 34.43 | 32.18 | dB/K |
| C/No (thermal) | 101.47 | 98.39 | 97.17 | dB.Hz |
| C/N (thermal) | 31.6 | 28.52 | 27.3 | dB |
| C/ACI | 25.03 | 21.95 | 25.03 | dB |
| C/ASI | 30.03 | 26.95 | 30.03 | dB |
| C/XPI | 25.03 | 21.95 | 23 | dB |
| C/IM | 25 | 25 | 25 | dB |
| C/(N+I) [ = Es/(No+Io) ] | 19.53 | 17.13 | 18.49 | dB |
| Eb/(No+Io) | 18.26 | 15.86 | 17.22 | dB |

FIG. 5D

| TOTALS PER CARRIER (End-to-End) | CLEAR | RAIN UP | RAIN DOWN | Units |
|---|---|---|---|---|
| C/No (thermal) | 78.9 | 75.82 | 78.86 | dB.Hz |
| C/N (thermal) | 9.03 | 5.95 | 8.99 | dB |
| C/ACI | 22.02 | 18.94 | 22.02 | dB |
| C/ASI | 6.51 | 3.43 | 6.51 | dB |
| C/XPI | 22.02 | 18.92 | 20.89 | dB |
| C/IM | 23.81 | 23.81 | 23.81 | dB |
| C/I (total) | 6.2 | 3.15 | 6.16 | dB |
| C/(No+Io) | 74.24 | 71.19 | 74.21 | dB.Hz |
| C/(N+I) [ = Es/(No+Io) ] | 4.37 | 1.32 | 4.34 | dB |
| Eb/(No+Io) | 3.1 | 0.05 | 3.07 | dB |
| Implementation loss | 0 | 0 | 0 | dB |
| System margin | 0 | 0 | 0 | dB |
| Net Es/(No+Io) | 4.37 | 1.32 | 4.34 | dB |
| Required Es/(No+Io) | 1.32 | 1.32 | 1.32 | dB |
| Excess margin | 3.05 | 0 | 3.02 | dB |

FIG. 5E

| EIRP DENSITY CALCULATIONS | CLEAR | RAIN UP | RAIN DOWN | Units |
|---|---|---|---|---|
| Flange transmit (up) | -51.93 | -51.93 | -51.93 | dBW/Hz |
| Satellite (down) | -25.37 | -28.45 | -25.37 | dBW/Hz |
| Flange receive (down) | -175.13 | -178.21 | -179.43 | dBW/Hz |

FIG. 5F

| EARTH STATION POWER REQUIREMENTS | VALUE | | | UNITS |
|---|---|---|---|---|
| EIRP per carrier | 43.94 | | | dBW |
| Antenna gain | 26 | | | dBi |
| Antenna feed flange power per carrier | 17.94 | | | dBW |
| Uplink power control | 0 | | | dB |
| HPA output back off | 0 | | | dB |
| Waveguide loss | 3 | | | dB |
| Number of HPA carriers | 1 | | | |
| Total HPA power required | 20.9389 | | | dBW |
| Required HPA power | 124.1342 | | | W |

FIG. 5G

| SPACE SEGMENT UTILIZATION | VALUE | | | UNITS |
|---|---|---|---|---|
| Overall availability | 99.9 | | | % |
| Information rate | 13 | | | Mbps |
| Information rate (inc overhead) | 13 | | | Mbps |
| Transmit rate | 19.403 | | | Mbps |
| Symbol rate | 9.7015 | | | Mbaud |
| Noise Bandwidth | 69.87 | | | dB.Hz |
| Occupied bandwidth | 13.097 | | | MHz |
| Minimum allocated bandwidth required | 13.097 | | | MHz |
| Allocated transponder bandwidth | 13.097 | | | MHz |
| Link efficiency | 0.993 | | | bps/Hz |
| Percentage transponder bandwidth used | 18.19 | | | % |
| Used transponder power | 44.5 | | | dBW |
| Percentage transponder power used | 18.18 | | | % |
| Max carriers / transponder | 5.5 | | | |
| Limited by: | Bandwidth | | | |
| Power equivalent bandwidth usage | 13.0909 | | | MHz |

FIG. 5H

| MODCOD | MODULATION INDEX | FEC RATE | Spectral Efficiency | Eb/No dB | Es/No dB |
|---|---|---|---|---|---|
| 0 | 1 (BPSK) | 0.488 | 0.4876 | 2.400 | -0.716 |
| 1 | 2 (QPSK) | 0.533 | 1.0669 | 2.200 | 2.478 |
| 2 | 2 (QPSK) | 0.631 | 1.2620 | 2.800 | 3.811 |
| 3 | 2 (QPSK) | 0.706 | 1.4111 | 3.300 | 4.798 |
| 4 | 2 (QPSK) | 0.803 | 1.6061 | 3.800 | 5.857 |
| 5 | 3 (8-QAM) | 0.642 | 1.9273 | 4.600 | 7.447 |
| 6 | 3 (8-QAM) | 0.711 | 2.1338 | 5.200 | 8.490 |
| 7 | 3 (8-QAM) | 0.780 | 2.3403 | 5.600 | 9.292 |
| 8 | 4 (16-QAM) | 0.731 | 2.9254 | 6.300 | 10.954 |
| 9 | 4 (16-QAM) | 0.780 | 3.1205 | 7.000 | 11.942 |
| 10 | 4 (16-QAM) | 0.829 | 3.3155 | 7.500 | 12.706 |
| 11 | 4 (16-QAM) | 0.853 | 3.4130 | 8.000 | 13.330 |

FIG. 6

| MODCOD | MODULATION INDEX & FEC | FEC RATE | Spectral Efficiency | Es/No (dB) |
|---|---|---|---|---|
| 0 | QPSK 1/4 | 0.250 | 0.490243 | -2.35 |
| 1 | QPSK 1/3 | 0.333 | 0.656448 | -1.24 |
| 2 | QPSK 2/5 | 0.400 | 0.789412 | -0.30 |
| 3 | QPSK 1/2 | 0.500 | 0.988858 | 1.00 |
| 4 | QPSK 3/5 | 0.600 | 1.188304 | 2.23 |
| 5 | QPSK 2/3 | 0.667 | 1.322253 | 3.10 |
| 6 | QPSK 3/4 | 0.750 | 1.487473 | 4.03 |
| 7 | QPSK 4/5 | 0.800 | 1.587196 | 4.68 |
| 8 | QPSK 5/6 | 0.833 | 1.654663 | 5.18 |
| 9 | QPSK 8/9 | 0.889 | 1.766451 | 6.20 |
| 10 | QPSK 9/10 | 0.900 | 1.788612 | 6.42 |
| 11 | 8PSK 3/4 | 0.750 | 1.779991 | 5.50 |
| 12 | 8PSK 2/3 | 0.667 | 1.980636 | 6.62 |
| 13 | 8PSK 3/4 | 0.750 | 2.228124 | 7.91 |
| 14 | 8PSK 5/6 | 0.833 | 2.478562 | 9.35 |
| 15 | 8PSK 8/9 | 0.889 | 2.646012 | 10.69 |
| 16 | 8PSK 9/10 | 0.900 | 2.679207 | 10.98 |
| 17 | 16APSK 2/3 | 0.667 | 2.637201 | 8.97 |
| 18 | 16APSK 3/4 | 0.750 | 2.966728 | 10.21 |
| 19 | 16APSK 4/5 | 0.800 | 3.165623 | 11.03 |
| 20 | 16APSK 5/6 | 0.833 | 3.300184 | 11.61 |
| 21 | 16APSK 8/9 | 0.889 | 3.523143 | 12.89 |
| 22 | 16APSK 9/10 | 0.900 | 3.567342 | 13.13 |
| 23 | 32APSK 3/4 | 0.750 | 3.703295 | 12.73 |
| 24 | 32APSK 4/5 | 0.800 | 3.951571 | 13.64 |
| 25 | 32APSK 5/6 | 0.833 | 4.119540 | 14.28 |
| 26 | 32APSK 8/9 | 0.889 | 4.397854 | 15.69 |
| 27 | 32APSK 9/10 | 0.900 | 4.453027 | 16.05 |

FIG. 7

METHOD AND SYSTEM FOR MODELING A NETWORK USING HISTORICAL WEATHER INFORMATION AND OPERATION WITH ADAPTIVE CODING AND MODULATION (ACM)

CROSS REFERENCE TO RELATED APPLICATIONS

This document claims the benefit of the filing date of U.S. Provisional Patent Application No. 61/596,124, entitled "A Method and System for Modeling a Network Using Historical Weather Information and Operation with Adaptive Coding and Modulation (ACM)" to Wallace Davis et al., which was filed on Feb. 7, 2012, the disclosure of which is hereby incorporated entirely by reference herein.

BACKGROUND

1. Technical Field

Aspects of this document relate generally to telecommunication systems and techniques for transmitting data across a telecommunication channel.

2. Background Art

The ability to model a transmission link is generally known in the art. Modeling a transmission link has been performed on communications links ranging from deep space, satellite transmission links, airborne, terrestrial links and underwater to ascertain the modeled or simulated characteristics of the link using real and assumed information for performing the simulation.

As background, in electromagnetic (EM) communications, the ability for a link to be established between two points (transmit and receive) is highly dependent on many parameters such as operating frequency, medium (air, space, water, etc.), obstructions, movement of the transmitting and receiving devices, etc. To establish the operating parameters for the operation of a communications link, traditionally a link budget analysis (LBA) is performed and a worst-case operating baseline is established. At that time, the devices are then placed into service with the appropriate antenna, amplifier size, etc.

In the prior art, an LBA is performed one time, taking the required availability of the link based on the operating frequency, path loss, available antenna gain, amplifier gain, etc., and using this information as a "worst case" condition of operation to meet the required availability. All information is based on coarse environmental data such as for example, rain data, and the LBA is performed and the terminal placed into service.

SUMMARY

Implementations of a method of dynamically modeling performance of a communications network may comprise modeling a communications network using a processor by performing a link budget analysis (LBA) for a proposed configuration of the communications network, the communications network comprising at least one transmitter, at least one satellite repeating relay, and at least one remote receiver, determining, by the processor, link performance of the communications network by applying historical environmental data to the model, adjusting, by the processor, one or more network configuration parameters based on the determined link performance to improve performance of the modeled communications network, and determining, by the processor, one or more final network configuration parameters by iteratively performing the LBA and adjusting the one or more network configuration parameters based on the determined link performance and historical environmental data.

Particular implementations may comprise one or more of the following features. The historical environmental data may comprise a precipitation density. The precipitation density may relate to a predetermined geographical area that is bound by geographical coordinates. The geographical coordinates may comprise degrees of latitude and longitude. The predetermined geographical area may contain at least one communications network component. The modeling may be constrained based on a selected time duration over which the historical environmental data was collected. The selected time duration may be equal to or greater than a total duration over which the historical environmental data was collected. The selected time duration may be less than a total duration over which the historical environmental data was collected. The method may further comprise stochastically altering one or more characteristics of the historical environmental data at time intervals less than a total duration over which the historical environmental data was collected.

An average of a value of the historical environmental data for a duration of time that is less than a total duration over which the historical environmental data was collected may be equal to an average of a value of the historical environmental data over a total duration over which the historical environmental data was collected. An average of a value of the historical environmental data for a duration of time that is less than a total duration over which the historical environmental data was collected may be greater than or less than an average of a value of the historical environmental data over a total duration over which the historical environmental data was collected. The LBA may be based on configuration information relating to characteristics of all transmitters. The LBA may be based on configuration information relating to characteristics of all satellite repeating relays. The method may further comprise receiving, by the processor, a predetermined information rate. The method may further comprise receiving, by the processor, at least one of a minimum information rate and a maximum information rate. The method may further comprise receiving, by the processor, a duration over which the modeling occurs. The method may further comprise receiving, by the processor, a duration of time over which the historical environmental data was collected.

The method may further comprise receiving, by the processor, updated historical environmental data and performing, by the processor, an LBA for each link in the communications network. The method may further comprise updating, by the processor, one or more available transmission characteristics for at least one of a transmit data rate and a receive data rate based on updated LBA information. The method may further comprise recording updated performance and availability information relating to the communications network based on the LBA performed for each link in the communications network based on the updated historical environmental data. The method may further comprise outputting the one or more final network configuration parameters and link and network availability statistics. The one or more final network configuration parameters may be used to configure a new communications network. The one or more final network configuration parameters may be used to re-configure an existing communications network. The processor may be a single processor. The processor may comprise a plurality of processors. The method may further comprise determining, by the processor, link performance of the communications network by applying real-time environmental data to the model.

Implementations of a system for dynamically modeling performance of a communications network may comprise a communications network comprising at least one transmitter, at least one satellite repeating relay, and at least one remote receiver and a processor configured to model the communications network by performing a link budget analysis (LBA) for a proposed configuration of the communications network, determine link performance of the communications network by applying historical environmental data to the model, adjust one or more network configuration parameters based on the determined link performance to improve performance of the modeled communications network, and determine one or more final network configuration parameters by iteratively performing the LBA and adjusting the one or more network configuration parameters based on the determined link performance and historical environmental data.

Particular implementations may comprise one or more of the following features. The historical environmental data may comprise a precipitation density. The precipitation density may relate to a predetermined geographical area that is bound by geographical coordinates. The geographical coordinates may comprise degrees of latitude and longitude. The predetermined geographical area may contain at least one communications network component. The model may be constrained based on a selected time duration over which the historical environmental data was collected. The selected time duration may be equal to or greater than a total duration over which the historical environmental data was collected. The selected time duration may be less than a total duration over which the historical environmental data was collected. The processor may be further configured to stochastically alter one or more characteristics of the historical environmental data at time intervals less than a total duration over which the historical environmental data was collected.

An average of a value of the historical environmental data for a duration of time that is less than a total duration over which the historical environmental data was collected may be equal to an average of a value of the historical environmental data over a total duration over which the historical environmental data was collected. An average of a value of the historical environmental data for a duration of time that is less than a total duration over which the historical environmental data was collected may be greater than or less than an average of a value of the historical environmental data over a total duration over which the historical environmental data was collected. The LBA may be based on configuration information relating to characteristics of all transmitters. The LBA may be based on configuration information relating to characteristics of all satellite repeating relays. The processor may be further configured to receive a predetermined information rate. The processor may be further configured to receive at least one of a minimum information rate and a maximum information rate. The processor may be further configured to receive a duration over which the modeling occurs. The processor may be further configured to receive a duration of time over which the historical environmental data was collected.

The processor may be further configured to receive updated historical environmental data and perform an LBA for each link in the communications network. The processor may be further configured to update one or more available transmission characteristics for at least one of a transmit data rate and a receive data rate based on updated LBA information. The processor may be further configured to record updated performance and availability information relating to the communications network based on the LBA performed for each link in the communications network based on the updated historical environmental data. The processor may be further configured to output the one or more final network configuration parameters and link and network availability statistics. The one or more final network configuration parameters may be used to configure a new communications network. The one or more final network configuration parameters may be used to re-configure an existing communications network. The processor may be a single processor. The processor may comprise a plurality of processors. The processor may be further configured to determine link performance of the communications network by applying real-time environmental data to the model.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

FIGS. 5A-H provide an example of a Link Budget Analysis for a transmission link using a commercial satellite repeating relay.

FIG. 6 shows an example of various modulation and FEC coding combinations of an exemplary MODCOD configuration and associated spectral efficiency, Eb/No, and Es/No required to close the link.

FIG. 7 shows an example of various modulation and FEC coding combinations of an exemplary DVB-S2 MODCOD configuration and associated spectral efficiency and Es/No required to close the link.

DESCRIPTION

Figure 1:
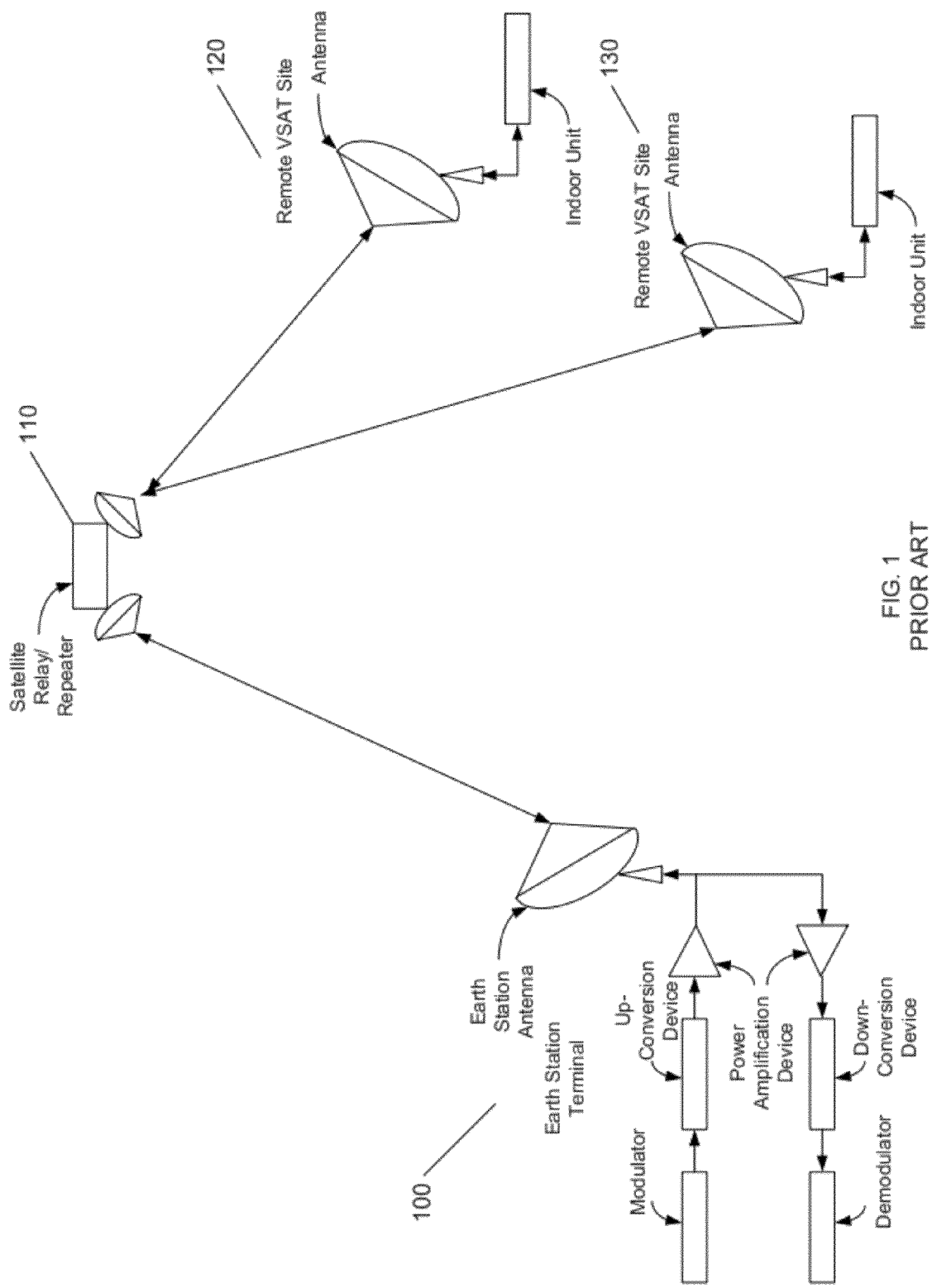
FIG. 1 is an illustration of an implementation of a geographically diverse satellite network with a hub earth station terminal communicating with multiple remote sites.

This disclosure, its aspects and implementations, are not limited to the specific components, frequency examples, or methods disclosed herein. Many additional components and assembly procedures known in the art consistent with a method and system for modeling a network using historical weather information and operation with adaptive coding and modulation (ACM) are in use with particular implementations from this disclosure. Accordingly, for example, although particular implementations are disclosed, such implementations and implementing components may comprise any components, models, versions, quantities, and/or the like are known in the art for such systems and implementing components, consistent with the intended operation.

In implementations of the described systems and methods, the results of the LBAs and network configuration are input into a modeling tool in which conditions may be modeled to determine network characteristics. One aspect of novelty of implementations of the described systems and methods is the use of historical environmental conditions such as, but not limited to, rain density for modeling a network. The result of using actual environmental data is that historical information may be used as an indicator of the availability of the communications link that one could expect to experience under the established operating conditions. For example, rainfall zones are available and provide a rain density based on a number of millimeters of rain per hour (mm/hr) over the course of a year. The rain zones are provided throughout the world and may be used as inputs into an LBA to establish baseline information for a model rather than simply the worst-case data.

As a more specific example of historical environmental data that may be used, the Japan Aerospace Exploration Agency (JAXA) keeps records of historical precipitation data over many years. The rain data may be obtained, extracted and input into the modeling tool at recorded intervals when the data was recorded and the results collected over the available recordation period.

The results of the modeled data allow one to know with a high degree of confidence the conditions that may be expected for operation of the network using actual historical data. The data that is harvested from the modeling exercise may be used to configure a network for operation before being placed into service or changes may be made to the network during or after being placed into service.

This disclosure relates to, but is not limited to a method and system for modeling a network using historical weather information and operation with adaptive coding and modulation (ACM) technique. With the introduction of Adaptive Coding and Modulation (ACM) as described in European Telecommunications Standards Institute (ETSI) engineering requirements (EN 302-307) which describes in introductory terms ACM approach for addressing dynamic link conditions, hereby incorporated herein by reference, the link may be automatically and dynamically adjusted to changing conditions. Implementations of the described methods and systems may support point-to-point, point-to-multipoint and multi-point-to-multipoint networks that provide transmission from a source to a destination and may utilize a repeating relay such as a space-based satellite repeating relay or an airborne repeating relay.

Implementations of the described methods and systems may provide a way of determining the availability of a link or network by using historical environmental data such as, but not limited to, precipitation (rain) data, and modeling a network using the historical data over the available collection period of the data. The result of the modeling exercise may be used for determining the optimal mode and configuration for network operation and provide an expected availability based on the historical environmental conditions that are being modeled.

An aspect of novelty of the disclosure is that a Link Budget Analysis (LBA) is no longer performed one time for a transmission link and the site then placed into service, but instead, the results of the LBA may be input into the described model, with actual historical environmental data modeled. Implementations of the described systems and methods use the LBA and the rain data to build the LBAs that are input into the model. This information is known as the baseline information for the model. Once the baseline information is loaded into the model, historical environmental information may be selected for use for performing the modeling of the network. Additional input into the model may be the desired availability (from the LBA or directly input from the user) and the results of the modeling exercise that therefore results in confirmation of the availability and whether the desired availability may be achieved. Possible outcomes of the modeling process may be as follows:

1). In the event that the availability is not achieved or an inefficiency results in too little power or bandwidth being allocated for a site or sites, the model may suggest a more appropriate modulation factor and Forward Error Correction (FEC) rate (MODCOD) configuration.

2). In the event that the availability is too high or an inefficiency results in too much power or bandwidth being allocated for a given site or sites, the model may suggest a more appropriate modulation factor and FEC rate (MODCOD) configuration.

In addition to the LBA information, which may include for example, availability, MODCODs, amplifier size, antenna size, repeating relay characteristics, etc., the input into the model may be the desired data rate configuration. The model expects, as a minimum, for the Committed Information Rate (CIR) to be input into the model. The CIR is the expected amount of bandwidth that one would expect the network to provide based on a Service Level Agreement (SLA). The CIR is what the model may strive to optimize. Additional inputs may be, for example, the Minimum Information Rate (MinIR) and Maximum Information Rate (MIR).

Upon running the model, the results may be the confirmation of the LBA for one, a group of, or all sites, to include factors such as availability, MODCODs, amplifier size, antenna size, and data carriage capabilities, etc. The output of the model may provide the data characteristics such as, but not limited to, MinIR, CIR, and MIR.

Particular implementations of methods and systems for modeling a network using historical weather information and operation with adaptive coding and modulation (ACM) techniques disclosed herein may be specifically employed in satellite communications systems. However, as will be clear to those of ordinary skill in the art from this disclosure, the principles and aspects disclosed herein may readily be applied to any electromagnetic (for example, IF, RF and optical) communications system, such as terrestrial broadcast network without undue experimentation.

Particular embodiments of the described methods pertain to satellite technology, but the methods and systems described are not limited to satellite technology, and may be applied to ground, airborne and space-based networks and systems. The need for more bandwidth continues to challenge the industry. The options that are available to network operators are to add more bandwidth, but for radio transmission networks, spectrum is finite, and it may not be possible to simply add spectrum. Implementations of the method and system described in this disclosure allow one to further optimize the available spectrum by utilizing a plurality of metrics that may be available for optimizing the transmission link.

In satellite communications, for frequencies above X-Band (approximately seven Giga-Hertz (7 GHz)), rain attenuation becomes a significant problem. The density of the rain droplets results in absorption of the signal and the signal becomes attenuated as it passes through the water droplets. As the frequencies become higher (Ku-Band, Ka-Band, V-Band, etc.) the problem becomes more significant. Implementations of the described method may use historical rain data (as one type of environmental data) in the form of a rain rate for a particular location. As mentioned previously, one source of this data may be, but is not limited to, the Japan Aerospace Exploration Agency (JAXA), which provides historical rain density for each year after 1998. The JAXA rainfall historical data provides hourly data from 60° N to 60° S latitude and 360° longitude resulting in weather data being available at in a cell (latitude/longitude) 0.1°×0.1° and 0.25°×0.25°. The JAXA rain data is available in comma separated variable (CSV) files that maybe imported into the model in real time or pre-processed and stored as database files.

FIG. 1 illustrates a typical satellite configuration with three sites. A hub earth station terminal 100 is communicating over a satellite repeating relay 110 to two geographically diverse remote sites 120, 130. As shown in FIG. 1, an antenna and power amplification devices are present at the hub earth station terminal 100, satellite repeating relay 110 and the remote VSAT site 120, 130. Each device (earth stations 100, 120, 130 and satellite repeating relay 110) all have antennas and amplifications devices with gain, but the path between the earth stations 100, 120, 130 and the satellite 110 have losses. As example, a Ku-Band signal operating with an uplink center frequency of 14 GHz would have a Free-Space Path Loss (FSPL) from the earth station 100 to the satellite 110 of approximately 207.0 Decibels (dB) with no impairments (rain, clouds, etc.). The path from the satellite 110 to an earth station 120, 130 with a downlink center frequency of 12 GHz would have a path loss of approximately 205.5 dB with no impairments (rain, clouds, etc.).

Figure 2:
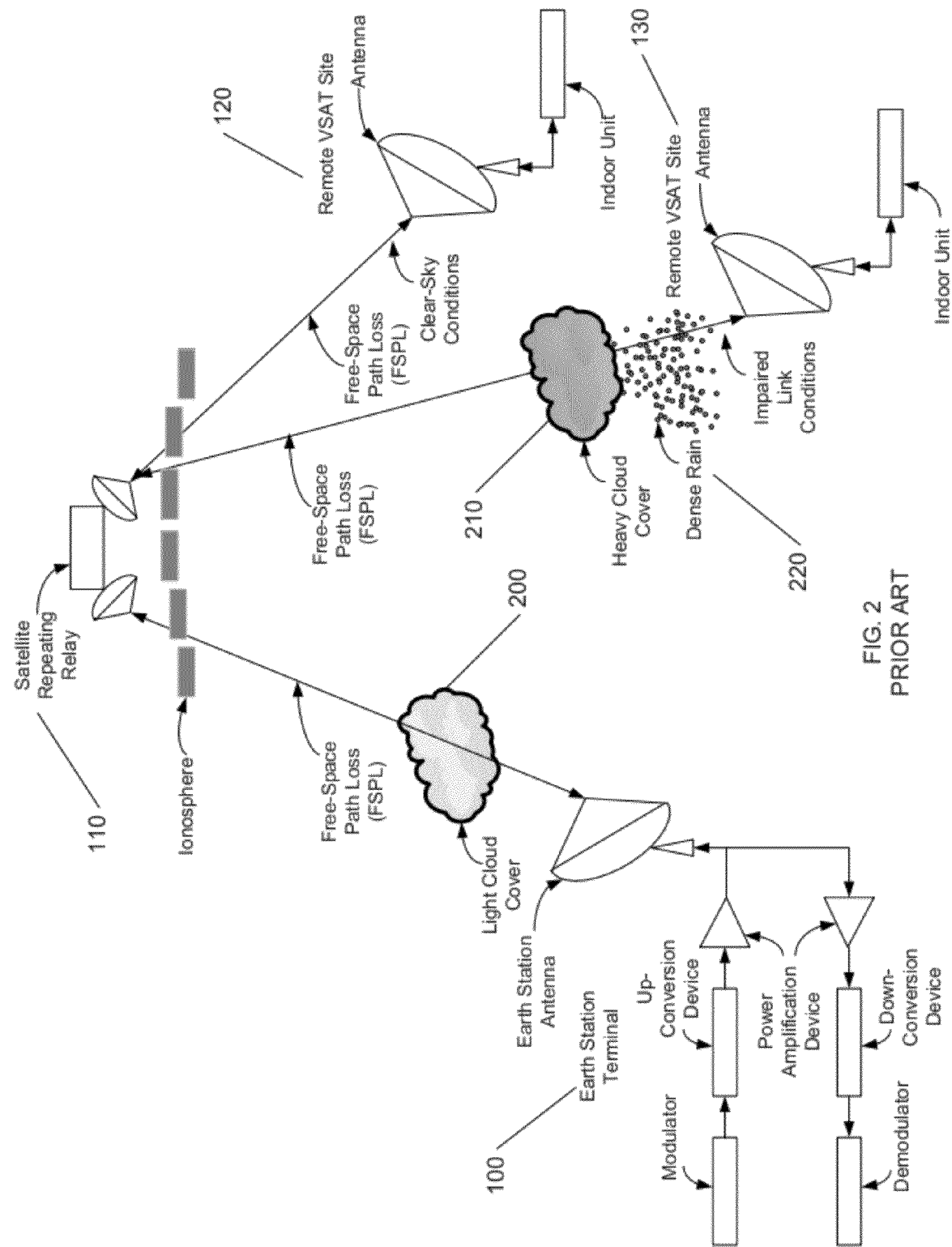
FIG. 2 is an illustration of a geographically diverse satellite network with a hub earth station terminal communicating with multiple remote sites while experiencing varying environmental conditions.

FIG. 2 illustrates a typical satellite configuration with three sites and the associated areas where transmission loss may be introduced. A hub earth station terminal 100 is communicating over a satellite repeating relay 110 to two geographically diverse remote sites 120, 130. In the illustration, the FSPL remains relatively constant for stationary terminals, but changes slightly for mobile terminals and ephemeris affects due to satellite movement. However, below an altitude of 20 Km (65,000 feet), weather conditions may have a drastic effect on the transmission path. Clouds 200, 210 or water vapor have a slight effect (depending on the transmission frequency), but the most pronounced attenuation as a result of weather is due to precipitation 220. Condensation may form on a radome or antenna reflector and which creates wetting losses.

Figure 3:
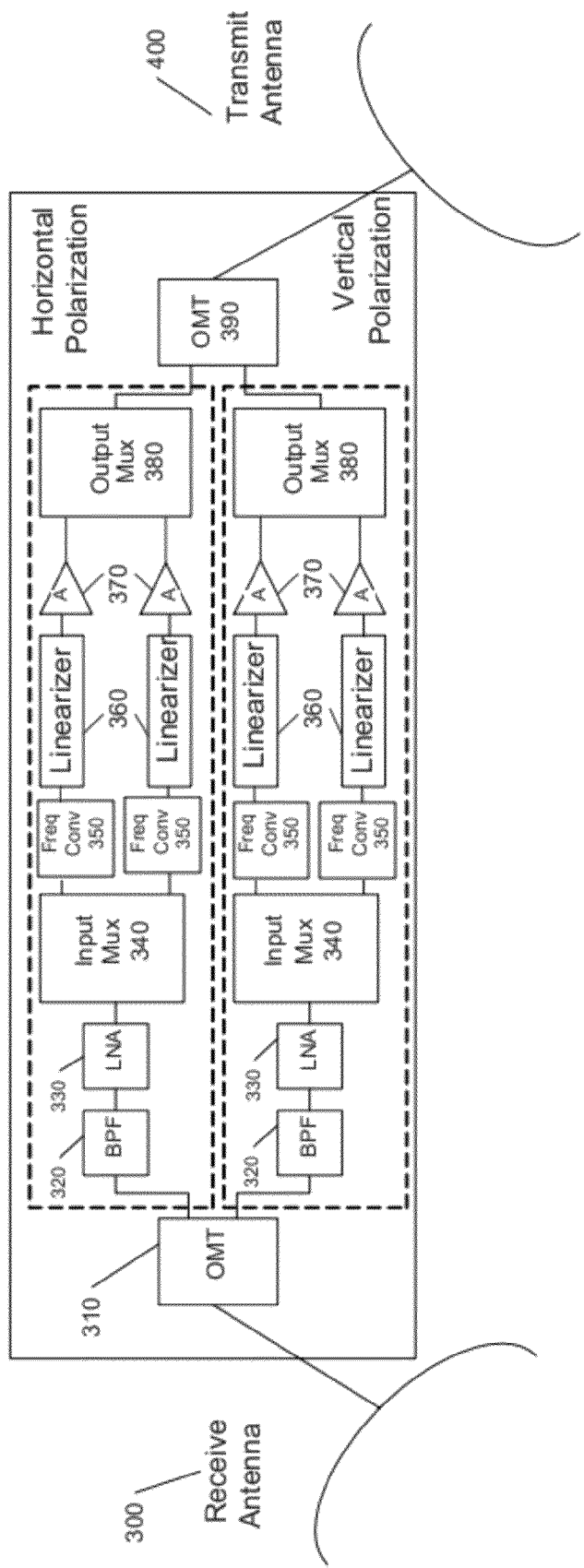
FIG. 3 is an illustration of an implementation of a satellite repeating relay.
Figure 4:
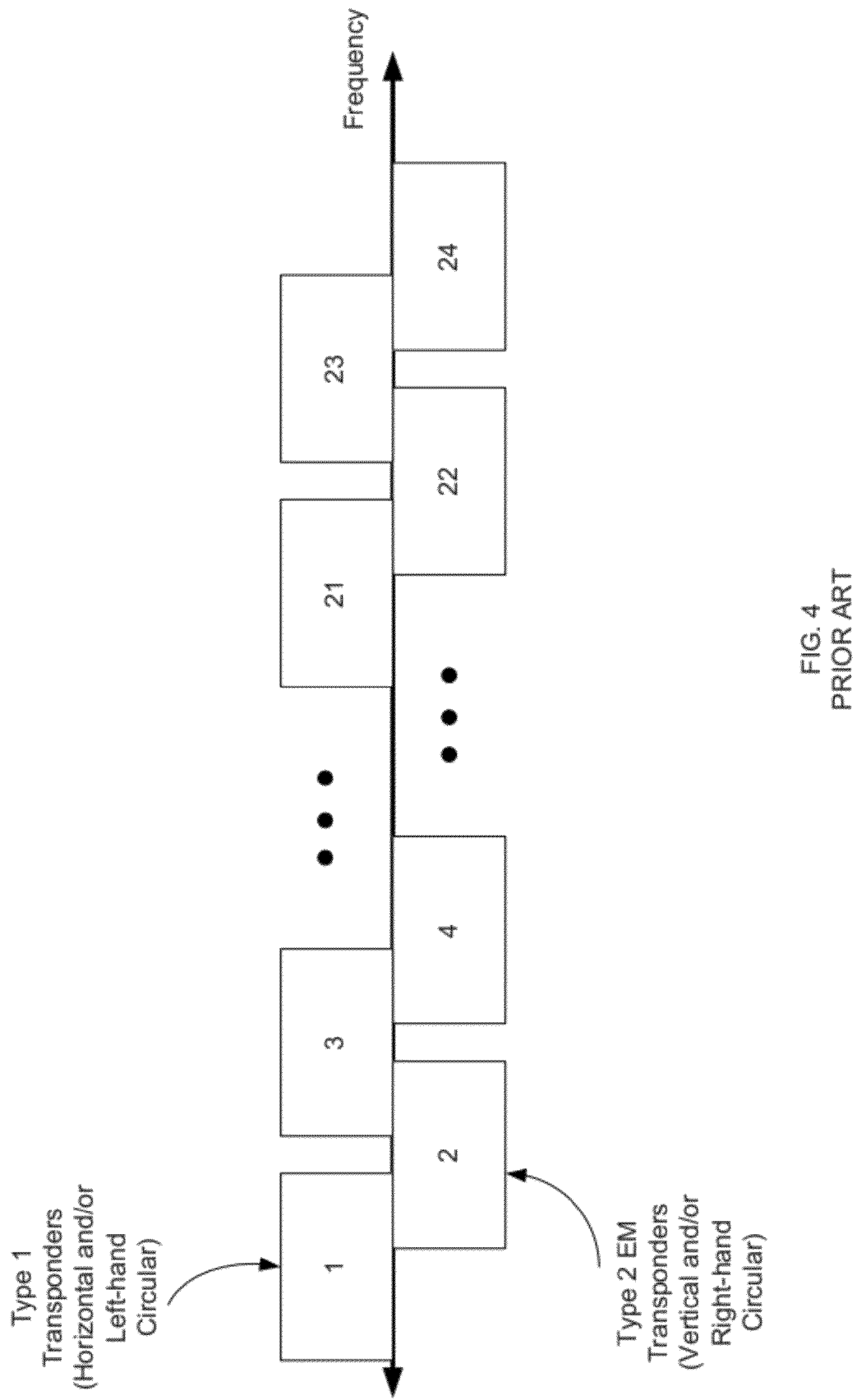
FIG. 4 is an illustration of transponders on a satellite repeating relay based on an implementation of an electromagnetic (EM) polarization configuration.

FIG. 3 illustrates a typical satellite based repeating relay used in the art with no onboard processing. The repeating relay comprises an input (receive antenna) 300 which receives the incoming carrier signals, Orthogonal Mode Transducer (OMT) 310 that separates the various electromagnetic (EM) polarizations, Bandpass Filters (BPF) 320 that filter the frequency spectrum, a Low-Noise Amplifier (LNA) 330 that allows the received carrier signals to be power amplified, a multiplexer 340 which separates the various frequency spectra to the appropriate transponder and a frequency converter 350 to convert to the downlink frequency. The repeating relay further linearizes 360 any non-linearity due to the amplifiers, amplifies 370 before transmitting back to the destination, multiplexes 380 to the proper EM polarization configuration and feeds to the OMT 390 to the transmit antenna 400 feed for relay. The configuration of the transponders of the repeating relay may be comprised of a single transponder or a plurality of EM transponders with or without overlapping frequencies as shown in FIG. 4.

FIGS. 5A-H illustrate examples of inputs of a Link Budget Analysis (LBA). Implementations of the described methods continue to take advantage of the LBA which appears as a large equation with dependencies on factors such as by non-limiting example, uplink and downlink frequencies, antenna gain, amplifier gain, path loss, location, satellite figure of merit (G/T), and equivalent isotropically radiated power (EIRP).

FIGS. 6 and 7 are tables showing a representation of available modulation and FEC coding rates, spectral efficiencies and required Es/No or Eb/No rates to provide a given performance at a known Bit Error Rate (BER) or Packet Error Rate (PER). The link performance is known along with the available power, the allocation of spectrum, etc. are distributed and the appropriate MODCOD may be applied to the link to meet the requisite service level or as known in the art Service Level Agreement (SLA) which may be based on providing a guaranteed amount of bandwidth known as a Committed Information Rate (CIR).

Figure 8:
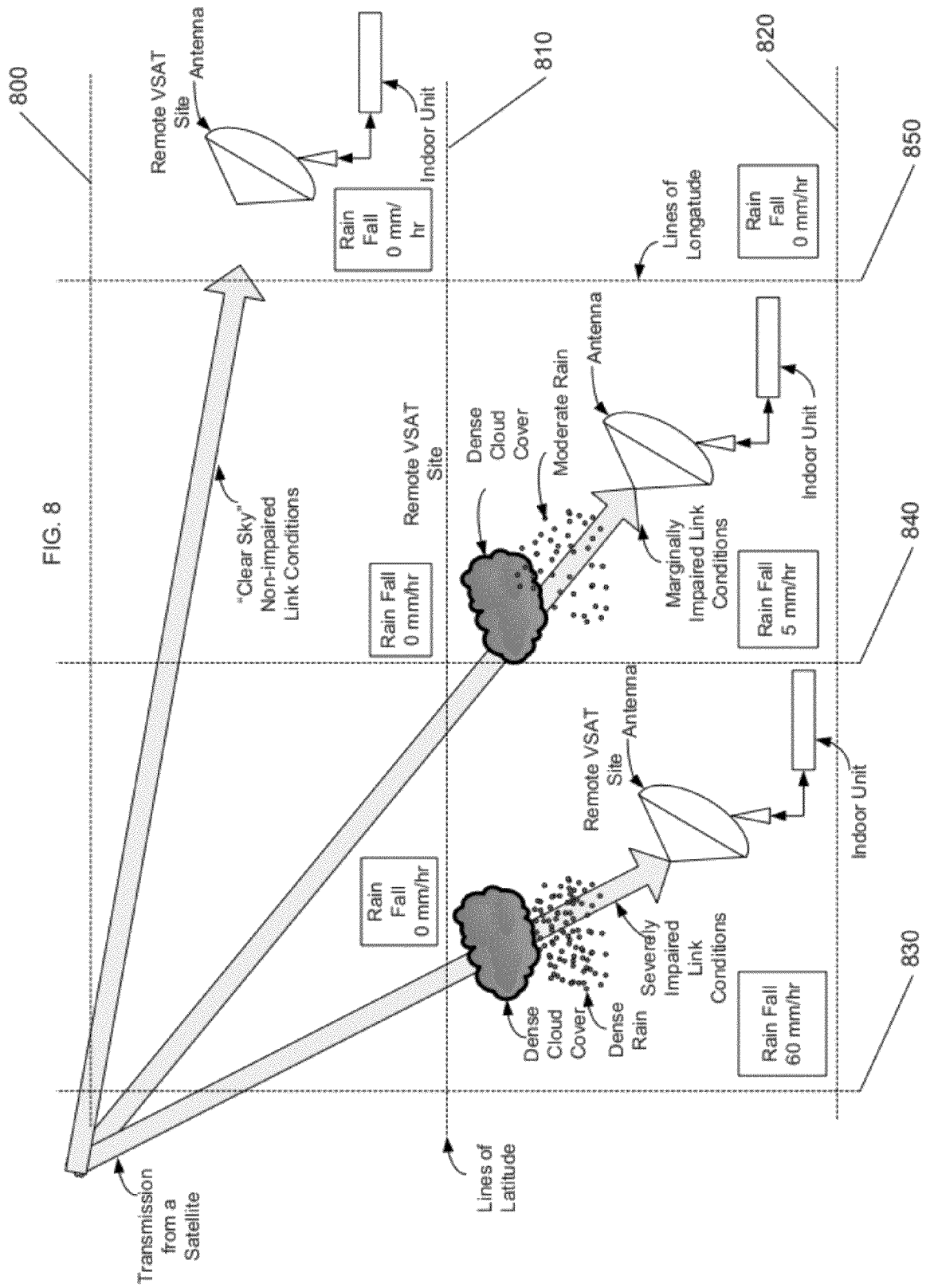
FIG. 8 is an illustration of a network on a latitude and longitude grid having terminals located at different points on the grid showing various conditions experienced in each cell.

FIG. 8 illustrates the placement of terminals on a latitude and longitude grid. For each terminal in the model, the latitude 800, 810, 820 and longitude 830, 840, 850 may be entered for each site in the model, and depending on the location of the site within the cell (bound by an upper and lower latitude 800, 810, 820 and longitude 830, 840, 850) on the grid, the JAXA rain data may be extracted for that cell for the modeling exercise.

As the model runs, the cells that do not contain sites have no reason to be processed and may be ignored for the simulation. For sites that have sites in the cells, the data is extracted for the duration (seconds, minutes, hours, days, months, years, etc.) of the simulation period. As a user input to the model, the selection of the year, month, day, hours, seconds, etc. period of modeling, etc. may be selected to run the model.

Figure 9:
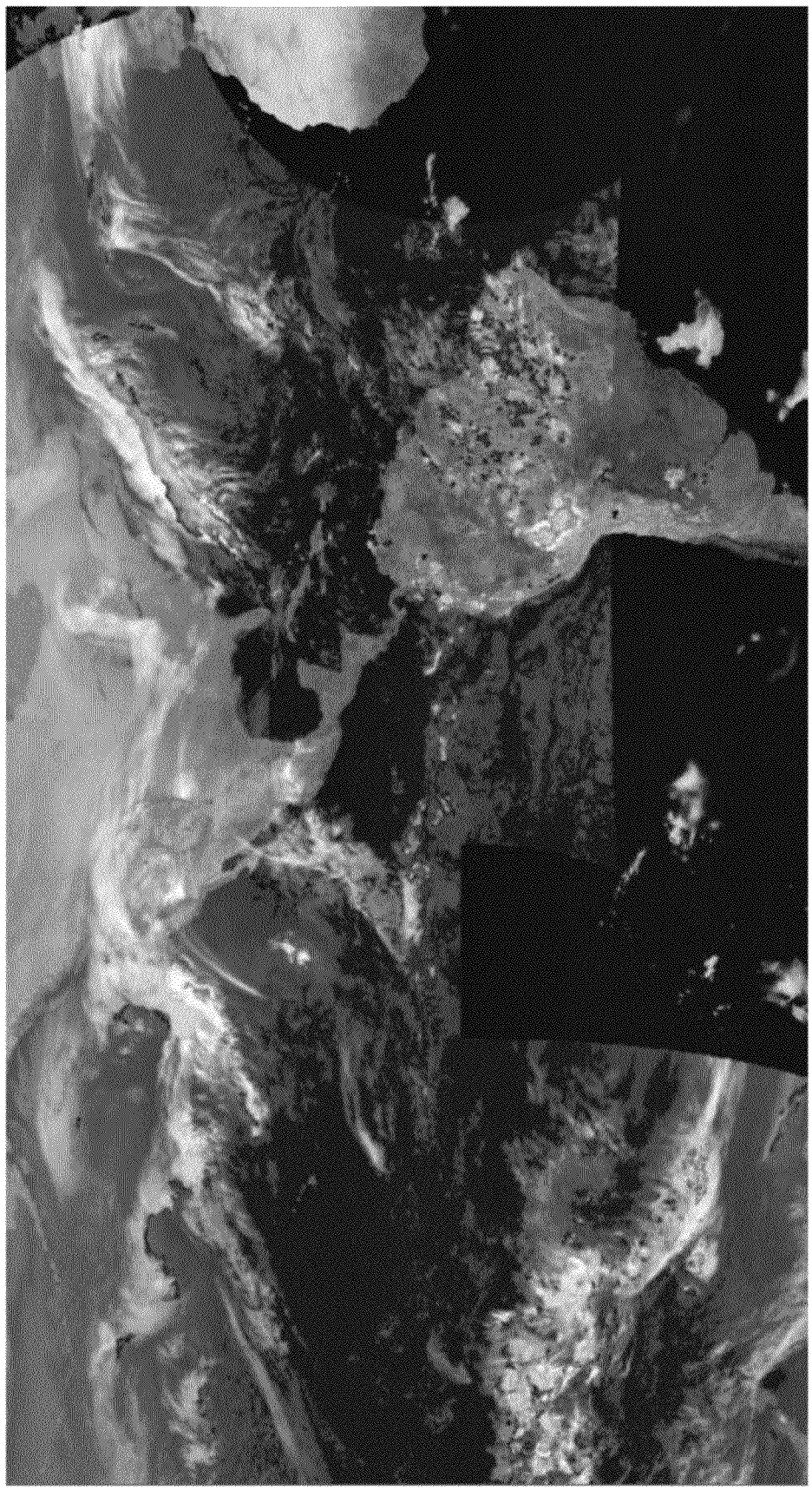
FIG. 9 is a diagram showing graphical actual rain data information from the Japan Aerospace Exploration Agency (JAXA) collected for input into an implementation of the model.

FIG. 9 illustrates a graphical representation of the JAXA data for snapshot in time based on a mapped view. The duration of the data may be, for example, the course of an hour. The data may be further stored on an hourly interval as the cell (bound by and upper and lower latitude and longitude) as a grid in a CSV file as data for historical records. The historical rain information may be inserted into the model at this stage of the processing. Weather data comprising the cloud type, height, density of precipitation, etc. may be obtained, formatted and input into the model.

As a result of the data being stored as an hourly snapshot in time of rainfall in mm/hr, the data becomes highly integrated (averaged). To remove the integration, implementations of the method allow one to artificially modify (stochastically model) the rainfall rate within the hour, thus removing some of the integration of the data. This modification has the result of making the data "better or worse" than the average. Altering the data will allow the data to have a maxima and minima that may be above and below the actual rainfall rate. A characteristic may be given to the data to have a function over the course of the data. The average of the data will still be bound by the reported data, but at a given time over the collection data, the instantaneous data may be higher or lower than the collected average.

Figure 10:
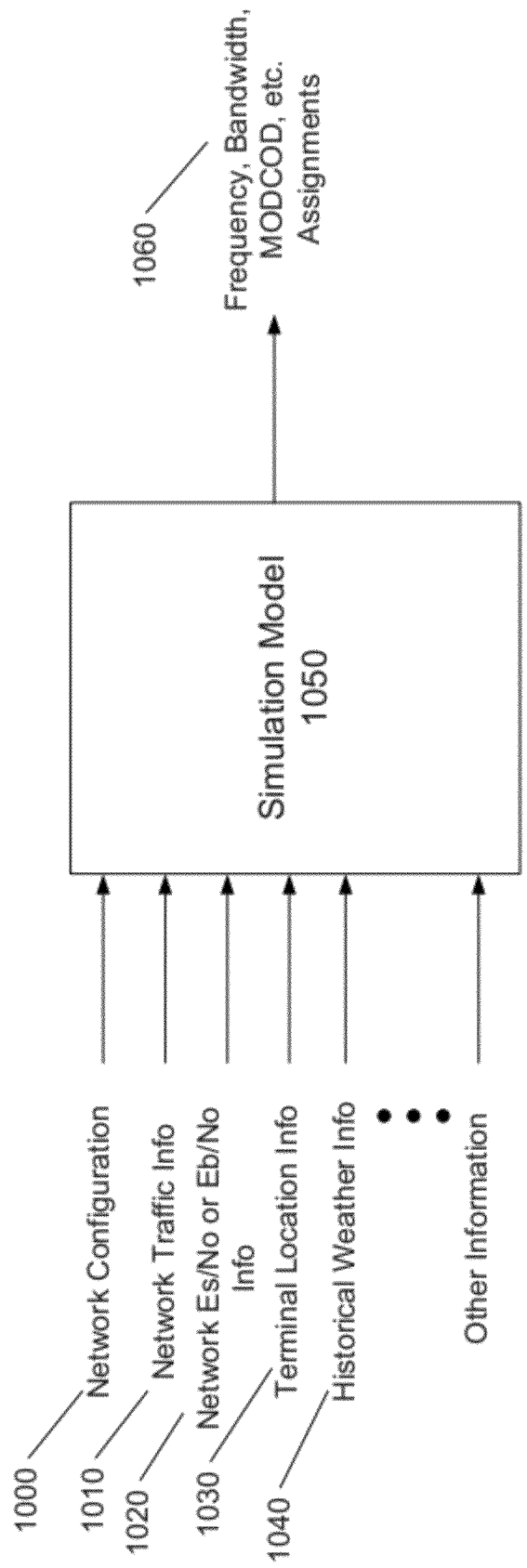
FIG. 10 is a block diagram showing the examples of possible inputs into an implementation of the processing model along with possible outputs.

FIG. 10 illustrates an implementation of a processing module 1050 where the input may be a plurality of information such as, for example, parameters of network configuration 1000, network traffic 1010, network Es/No or Eb/No 1020, terminal location (static or dynamic) 1030, weather information 1040, etc. where it may be processed. The result of the modeling may provide the resulting characteristics 1060 of the network over time to include for example, link attenuation, bandwidth, modulation, FEC coding, Es/No, Eb/No, Bit Error Rate (BER), link and network availability, etc. of the network.

The processing of the modeling may be accomplished as follows:
1.) Input a network complete with remotes, outbound and inbound satellite. characteristics, latitude/longitude, per site to include a hub and remote(s), etc.
2.) Input the desired Group Quality of Service (QoS), CIR and MIR including the mapping of remote to each Group QoS.
3.) Input the desired period of time to perform the simulation (based on historical environmental information availability) and import actual historical rain data into the model for each site based the location in a cell.
4.) For each increment of time (hourly, 15 minutes, etc. (based on the resolution of the data)):
   a. Perform a link budget on each remote.
   b. Determine the maximum outbound (hub-to-remote) MODCOD and max inbound (remote-to-hub) MOD-COD to achieve Quasi-Error Free (BER of typically 1E-8) for each link to/from the remote.
   c. Apply per remote MODCOD conditions into an algorithm that determines outbound and inbound network availability.
   d. Store the MinIR data rate, CIR data rate and MIR data rate (if available), availability, Es/No, Eb/No, Link Attenuation, etc. for the period of simulation/modeling time.
5.) Process the stored availability statistics to determine the network wide MinIR, CIR and MIR availability for an entire year or other desired time period.
6.) Process the resulting availability statistics to size (determine capacity) of the network capacity for availability when:
   a. The outbound is using an ACM or a Variable Coding Modulation (VCM) in which there are finite steps in the MODCOD that are available, as opposed to the dynamic assignment of MODCODs when using ACM; and/or
   b. The inbound is using the Dynamic Single Channel Per Carrier (dSCPC)+ACM+MIR capacity based on the disclosure of U.S. Provisional Patent Application No. 61/552,233 filed on Oct. 27, 2011 entitled "A Method and System for Adaptive Coding and Modulation (ACM) for Supporting Mesh Network Connectivity for Multipoint Networks," the contents of which is hereby incorporated by reference in its entirety.

The processing of the modeling/simulation of implementations of the described method and system may be performed using, but is not limited to one or more of a Generic Central Processing Unit (GCPU), Field Programmable Gate Array (FPGA), Digital Signal Processor (DSP), etc.

In the prior art, only the traditional LBA was historically performed and the site placed into service without any further LBAs being undertaken. With the dynamic nature of networks, implementations of the described system and method allow one to not only perform an LBA, but use the LBA information to be utilized, by non-limiting example, with historical rain data to more accurately model or simulate a given network. The resulting output may be used to guide the network planner and configuration of a network based on the results of this modeling technique. The results ultimately confirm the desired availability, data rate carriage capabilities, etc. of the network.

The following are particular implementations of methods and systems for modeling a network using historical weather information and operation with adaptive coding and modulation (ACM) information techniques and are provided as non-limiting examples:

Example 1

A satellite network is modeled as a hub-spoke Very Small Aperture Terminal (VSAT) with a single fixed hub earth station and 10 geographically diverse, fixed-remote sites over Ku-Band geostationary satellite repeating relay. The network is configured to operate as an ACM outbound link (hub-to-remotes) and ACM inbound links (remotes-to-hub). The network is configured to support a given SLA containing a CIR for each outbound of 1 Mbps and a return of 256 Kbps. The network is configured to provide an availability of 99.95%. The simulation is configured to use the rain data for the year of 2007 and is configured to run for one year (8,760 hours). The model is started and the rain data is extracted for the one hub site and the ten remote sites and input into the simulation. The model is run for the duration of one year using the unmodified (no stochastic changes to the rain data) rain data for year 2007. The results are then calculated to demonstrate the availability of every link and then combined to provide the total network availability. The resulting modeled MinIR, CIR and MIR for all data flowing thought the model between (to/from) the hub and remote sites is made available. Additionally, attenuation, Es/No, Eb/No, etc. may be output from the model. In particular implementations of the system described in this Example, the satellite uses Ka-Band or V-Band, resulting in the same operation.

Example 2

A satellite network is modeled as a hub-spoke Very Small Aperture Terminal (VSAT) with a single fixed hub earth station and 20 geographically diverse, fixed-remote sites over Ka-Band geostationary satellite repeating relay. The network is configured to operate as an ACM outbound link (hub-to-remotes) and ACM inbound links (remotes-to-hub). The network is configured to support a given SLA containing a CIR for each outbound of 512 Mbps and a return of 512 Kbps. The network is configured to provide an availability of 99.90%. The simulation is configured to use the rain data for the year of 2005 and is configured to run for two years (17,520 hours). The model is started and the rain data is extracted for the one hub site and the 20 remote sites and input into the simulation. The stochastic (de-integration parameters) are set to un-integrate the data and the rain data is updated. The model is run for the duration of two years using the modified (stochastically changed rain data) rain data for year 2005. The results are then calculated to demonstrate the availability of every link and then combined to provide the total network availability. The resulting modeled MinIR, CIR and MIR for all data flowing thought the model between (to/from) the hub and remotes is made available. Additionally, attenuation, Es/No, Eb/No, etc. may be output from the model. In particular implementations of the system described in this Example, the satellite uses Ku-Band or V-Band, resulting in the same operation.

In places where the description above refers to particular implementations of telecommunications systems and methods, it should be readily apparent that a number of modifications may be made without departing from the spirit thereof and that these implementations may be applied to other telecommunications system and method implementations.

The invention claimed is:

1. A method of dynamically modeling performance of a communications network, the method comprising:
   modeling a communications network using a processor by performing a link budget analysis (LBA) for a proposed configuration of the communications network, the communications network comprising at least one transmitter, at least one satellite repeating relay, and at least one remote receiver;
   determining, by the processor, link performance of a link within the communications network by applying historical environmental data to the model;
   adjusting, by the processor, one or more network configuration parameters other than a transmit power based on the determined link performance to improve performance of the modeled communications network while substantially maintaining a committed information rate; and
   determining, by the processor, one or more final network configuration parameters by iteratively performing the LBA and adjusting the one or more network configuration parameters based on the determined link performance and historical environmental data.

2. The method of claim 1, wherein the historical environmental data comprises a precipitation density.

3. The method of claim 2, wherein the precipitation density relates to a predetermined geographical area that is bound by geographical coordinates.

4. The method of claim 3, wherein the geographical coordinates comprise degrees of latitude and longitude.

5. The method of claim 3, wherein the predetermined geographical area contains at least one communications network component.

6. The method of claim 1, wherein the modeling is constrained based on a selected time duration over which the historical environmental data was collected.

7. The method of claim 6, wherein the selected time duration is equal to or greater than a total duration over which the historical environmental data was collected.

8. The method of claim 6, wherein the selected time duration is less than a total duration over which the historical environmental data was collected.

9. The method of claim 8, further comprising stochastically altering one or more characteristics of the historical environmental data at time intervals less than a total duration over which the historical environmental data was collected.

10. The method of claim 8, wherein an average of a value of the historical environmental data for a duration of time that is less than a total duration over which the historical environmental data was collected is equal to an average of a value of the historical environmental data over a total duration over which the historical environmental data was collected.

11. The method of claim 8, wherein an average of a value of the historical environmental data for a duration of time that is less than a total duration over which the historical environmental data was collected is greater than or less than an average of a value of the historical environmental data over a total duration over which the historical environmental data was collected.

12. The method of claim 1, wherein the LBA is based on configuration information relating to characteristics of all transmitters.

13. The method of claim 1, wherein the LBA is based on configuration information relating to characteristics of all satellite repeating relays.

14. The method of claim 1, further comprising receiving, by the processor, a predetermined information rate.

15. The method of claim 1, further comprising receiving, by the processor, at least one of a minimum information rate and a maximum information rate.

16. The method of claim 1, further comprising receiving, by the processor, a duration over which the modeling occurs.

17. The method of claim 1, further comprising receiving, by the processor, a duration of time over which the historical environmental data was collected.

18. The method of claim 1, further comprising:
   receiving, by the processor, updated historical environmental data; and
   performing, by the processor, an LBA for each link in the communications network.

19. The method of claim 18, further comprising updating, by the processor, one or more available transmission characteristics for at least one of a transmit data rate and a receive data rate based on updated LBA information.

20. The method of claim 19, further comprising recording updated performance and availability information relating to the communications network based on the LBA performed for each link in the communications network based on the updated historical environmental data.

21. The method of claim 1, further comprising outputting the one or more final network configuration parameters and link and network availability statistics.

22. The method of claim 1, wherein the one or more final network configuration parameters are used to configure a new communications network.

23. The method of claim 1, wherein the one or more final network configuration parameters are used to re-configure an existing communications network.

24. The method of claim 1, wherein the processor is a single processor.

25. The method of claim 1, wherein the processor comprises a plurality of processors.

26. The method of claim 1, further comprising determining, by the processor, link performance of the communications network by applying real-time environmental data to the model.

27. A system for dynamically modeling performance of a communications network, the system comprising:
   a communications network comprising at least one transmitter, at least one satellite repeating relay, and at least one remote receiver; and
   a processor configured to:
      model the communications network by performing a link budget analysis (LBA) for a proposed configuration of the communications network;
      determine link performance of a link within the communications network by applying historical environmental data to the model;
      adjust one or more network configuration parameters other than a transmit power based on the determined link performance to improve performance of the modeled communications network while substantially maintaining a committed information rate; and
      determine one or more final network configuration parameters by iteratively performing the LBA and adjusting the one or more network configuration parameters based on the determined link performance and historical environmental data.

28. The system of claim 27, wherein the historical environmental data comprises a precipitation density.

29. The system of claim 28, wherein the precipitation density relates to a predetermined geographical area that is bound by geographical coordinates.

30. The system of claim 29, wherein the geographical coordinates comprise degrees of latitude and longitude.

31. The system of claim 29, wherein the predetermined geographical area contains at least one communications network component.

32. The system of claim 27, wherein the model is constrained based on a selected time duration over which the historical environmental data was collected.

33. The system of claim 32, wherein the selected time duration is equal to or greater than a total duration over which the historical environmental data was collected.

34. The system of claim 32, wherein the selected time duration is less than a total duration over which the historical environmental data was collected.

35. The system of claim 34, wherein the processor is further configured to stochastically alter one or more characteristics of the historical environmental data at time intervals less than a total duration over which the historical environmental data was collected.

36. The system of claim 34, wherein an average of a value of the historical environmental data for a duration of time that is less than a total duration over which the historical environmental data was collected is equal to an average of a value of the historical environmental data over a total duration over which the historical environmental data was collected.

37. The system of claim 34, wherein an average of a value of the historical environmental data for a duration of time that is less than a total duration over which the historical environmental data was collected is greater than or less than an average of a value of the historical environmental data over a total duration over which the historical environmental data was collected.

38. The system of claim 27, wherein the LBA is based on configuration information relating to characteristics of all transmitters.

39. The system of claim 27, wherein the LBA is based on configuration information relating to characteristics of all satellite repeating relays.

40. The system of claim 27, wherein the processor is further configured to receive a predetermined information rate.

41. The system of claim 27, wherein the processor is further configured to receive at least one of a minimum information rate and a maximum information rate.

42. The system of claim 27, wherein the processor is further configured to receive a duration over which the modeling occurs.

43. The system of claim 27, wherein the processor is further configured to receive a duration of time over which the historical environmental data was collected.

44. The system of claim 27, wherein the processor is further configured to:
   receive updated historical environmental data; and
   perform an LBA for each link in the communications network.

45. The system of claim 44, wherein the processor is further configured to update one or more available transmission characteristics for at least one of a transmit data rate and a receive data rate based on updated LBA information.

46. The system of claim 45, wherein the processor is further configured to record updated performance and availability information relating to the communications network based on the LBA performed for each link in the communications network based on the updated historical environmental data.

47. The system of claim 27, wherein the processor is further configured to output the one or more final network configuration parameters and link and network availability statistics.

48. The system of claim 27, wherein the one or more final network configuration parameters are used to configure a new communications network.

49. The system of claim 27, wherein the one or more final network configuration parameters are used to re-configure an existing communications network.

50. The system of claim 27, wherein the processor is a single processor.

51. The system of claim 27, wherein the processor comprises a plurality of processors.

52. The system of claim 27, wherein the processor is further configured to determine link performance of the communications network by applying real-time environmental data to the model.

* * * * *